(12) United States Patent
Daum et al.

(10) Patent No.: US 7,918,696 B2
(45) Date of Patent: Apr. 5, 2011

(54) SYSTEM AND METHOD FOR DYNAMIC ENERGY RECOVERY IN MARINE PROPULSION

(75) Inventors: Wolfgang Daum, Erie, PA (US); Kyle Stott, Erie, PA (US); Ajith Kuttannair Kumar, Erie, PA (US); Rekha Prasad, Sewickley, PA (US); Tab Mong, Fairview, PA (US); John Manison, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 12/172,547

(22) Filed: Jul. 14, 2008

(65) Prior Publication Data
US 2010/0009578 A1 Jan. 14, 2010

(51) Int. Cl.
*B63H 21/22* (2006.01)
*B63H 23/00* (2006.01)
(52) U.S. Cl. .......................................................... 440/1
(58) Field of Classification Search .................. 440/1, 3, 440/4, 6, 84
See application file for complete search history.

(56) References Cited

U.S. PATENT DOCUMENTS

| 2,046,735 | A | | 7/1936 | Frisch et al. |
| 3,403,654 | A | | 10/1968 | Wilson |
| 3,476,072 | A | * | 11/1969 | Wayne .............................. 440/3 |
| 3,500,025 | A | | 3/1970 | Moulin et al. |
| 5,707,115 | A | | 1/1998 | Bodie et al. |
| 6,802,749 | B1 | | 10/2004 | Justus |
| 6,848,382 | B1 | | 2/2005 | Bekker |
| 2008/0182466 | A1 | | 7/2008 | Wegner-Donnelly et al. |

FOREIGN PATENT DOCUMENTS

| FR | 2842783 A | 1/2004 |
| JP | 11222168 A | 8/1999 |
| WO | 9740999 A | 11/1997 |
| WO | 20040080792 A | 9/2004 |

OTHER PUBLICATIONS

International Search Report issued in connection with corresponding PCT Application No. PCT/US2009/046220 on Dec. 23, 2009.
Written Opinion of the International Searching Authority issued in PCT Application No. PCT/US2009/046220 on Dec. 23, 2009.

* cited by examiner

*Primary Examiner* — Daniel V Venne
(74) *Attorney, Agent, or Firm* — Robert Wawrzyn; Alleman Hall McCoy Russell & Tuttle LLP

(57) ABSTRACT

A method for controlling operation of a propulsion system of a waterborne vessel, comprising adjusting recovery of energy generated from the propulsion system to maintain position of the waterborne vessel in response to at least an indication of vessel position.

9 Claims, 5 Drawing Sheets

SYSTEM AND METHOD FOR DYNAMIC ENERGY RECOVERY IN MARINE PROPULSION

FIELD

The present application relates to a propulsion system with dynamic positioning for marine applications.

BACKGROUND

Dynamic positioning (DP) is a computer control system to maintain a position of a vessel against environmental forces of current, wind and/or waves. The control system maintains position using propellers and/or thrusters on-board the vessel. A combination of position reference sensors and environmental sensors give position feedback for control of the position. In particular, DP may be used in oil and gas exploration, where vessels may be extended farther offshore from land in water depth sufficiently great that it is impractical to use anchor mooring systems.

However, the ability of the propeller and/or thrusters to maintain the desired position of the vessel may be limited by various factors. For example, the ability to change direction of a propeller, e.g., to change the thrusting force generated, may be too slow relative to the bandwidth requirements for accurate position control. Along these lines, therefore, the dynamic range of the thrust may be limited at higher bandwidths, especially with regard to the ability to reverse the thrust direction. As such, position control accuracy may degrade under some conditions depending on the particular wind direction, waves, etc.

BRIEF DESCRIPTION OF THE INVENTION

Accordingly, the above issues may be addressed by a systems and methods for controlling operation of a propulsion system of a waterborne vessel, comprising adjusting recovery of energy generated from the propulsion system to maintain position of the waterborne vessel in response to at least an indication of vessel position.

In one example, the propulsion system may recover braking energy that maintains position of the vessel. Additionally, the propulsion system may recover energy that maintains the sideways position of the vessel, while the vessel moves forward or backward. By using regenerative braking to assist in maintaining such position, not only can the dynamic range of the propulsion system be increased, but overall vessel efficiency can be improved. For example, a water flow actuator of the propulsion system, such as a thruster, can extend its range of actuation beyond positive thrust by generating a range of negative thrust amounts through regenerative braking. Specifically, the thruster can harness the kinetic energy of the moving water (inertia) through the thruster. As such, both position control, and overall system efficiency, can be improved.

In another embodiment, a method for controlling operation of a propulsion system of a first waterborne vessel may be provided, comprising: during transportation of the first vessel under power of a second vessel, recovering energy generated from the propulsion system of the first vessel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

The present invention will be better understood from reading the following description of non-limiting embodiments, with reference to the attached drawings, wherein below.

DETAILED DESCRIPTION

A waterborne vessel is described including a propulsion system and associated control system capable of accurately maintaining the vessel's position, referred to as a dynamic positioning. The position control utilizes one or more water flow actuators to generate stabilizing and position controlling forces and thereby counteracts wind, waves, and/or currents, for example. Further, the position control further varies an operating mode of the different water flow actuators so that at any condition, any of the water flow actuators may generate positive driving force/thrust, no force/thrust (idle), or negative braking force/thrust to maintain the vessel's position at a desired location. In some examples, braking energy may be harnessed via the propulsion system and used to drive other water flow actuators and/or charge an energy storage device for future energy requirements by other components or water flow actuators of the vessel. The following description, including the drawings, further describes a vessel propulsion system utilizing regenerative braking for improving dynamic positioning control of the vessel.

Additionally, the concepts herein can be applied to a first vessels being moved/positioned by a second vessel, such as a tug boat, in a harbor, river, open sea, or lake. Specifically, the first vessel may recover energy during such operation, such as by recovering energy during motion of the first vessel caused by motion of the second vessel. Further still, as noted above, the first vessel may recovery energy from environmental conditions such as wind, waves, and/or currents.

Further, the concepts herein can be applied to vessels in transit, where information regarding a traversed route can be used to control dynamic energy recovery from to environmental conditions such as wind, waves, and/or currents.

Figure 1:
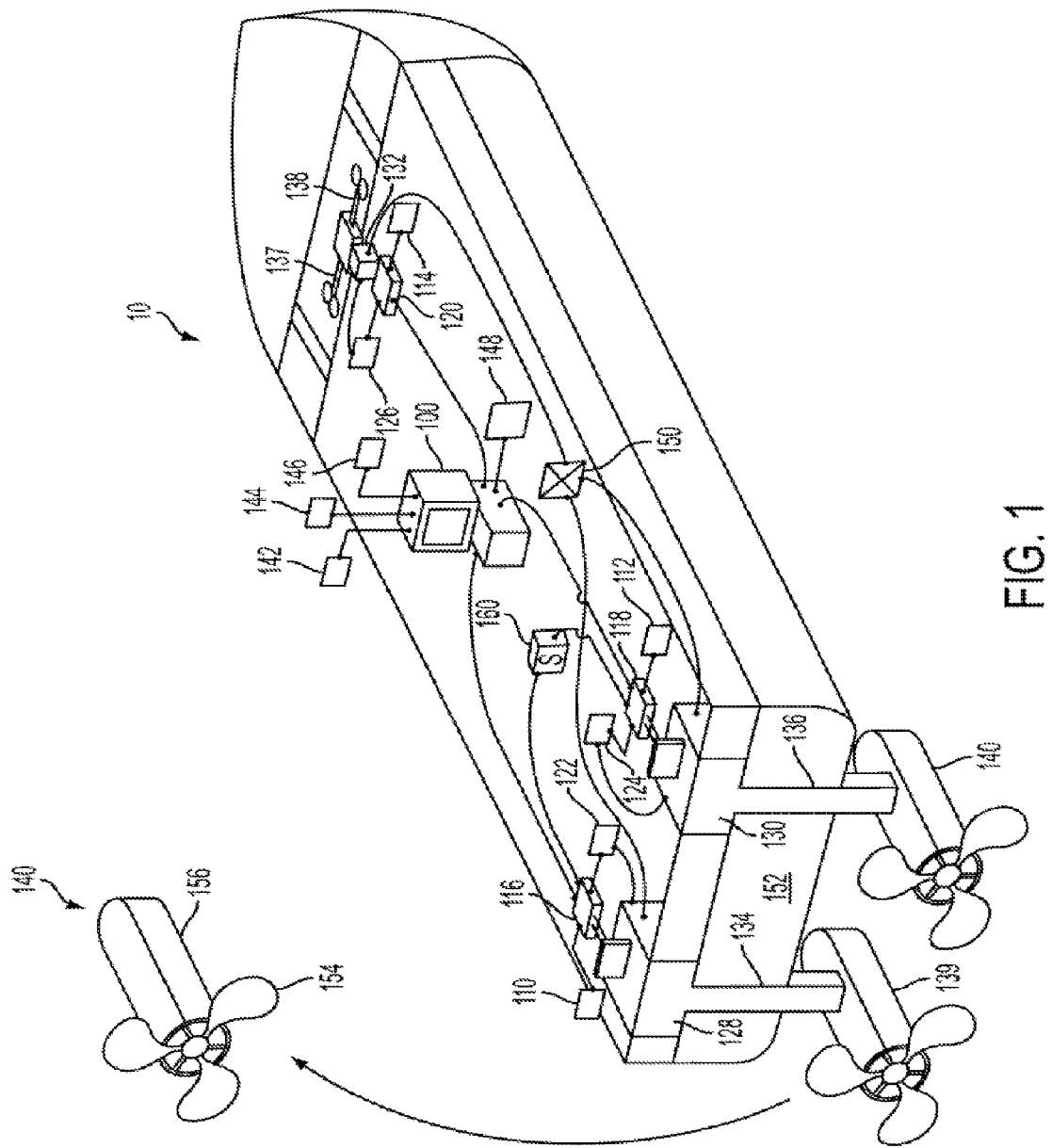
FIG. 1 shows an example orthographic view of a waterborne vessel propulsion system.

Referring to FIG. 1, it depicts an example propulsion system of a waterborne vessel 10, with dynamic positioning controller (DPC) 100, and two pairs of water flow actuators 137-140, one pair at the front end and one pair at the rear end of the vessel. While this example shows four water flow actuators, more or less water flow actuators may be used. The waterborne vessel 10 may be a ship, a supply vessel, a rig, a tugboat, etc. Water flow actuators may include a thruster (e.g., a bow/stern thruster, a tunnel thruster), a propeller (e.g. an azimuthing thruster, an azipod, a water jet propeller), a paddle wheel, etc. In one specific example, two tunnel thrusters and two propellers are used.

The DPC 100 maintains the vessel's position, such as the vessel's latitude, longitude and/or heading, by adjusting the thrust levels of the water flow actuators based on feedback signals from a plurality of sensors. The sensors include at least one of an environmental sensor 142, a position reference sensor 144, a motion sensor 146, and/or combinations thereof. The environmental sensor 142 detects changes in wind currents, storm occurrence, wave currents, etc. The environmental sensor 142 may include a wind sensor, a draught sensor, a current sensor, and/or combinations thereof. The position reference sensor 144 detects the actual location and heading of the vessel, and it may include a differential global positioning system sensor, a hydro-acoustic position sensor, a gyrocompass, a fan beam laser sensor, a vertical taut wire system sensor, a horizontal taut wire system sensor, a differential and absolute reference positioning system (DARPS) sensor, an Artemis radar sensor, and/or combinations thereof. The motion sensor 146 detects oscillations of the vessel, changes in the heading, etc., and it may include an accelerometer, a gyroscope, and/or combinations thereof.

Each of the water flow actuators may be coupled to a water flow actuator driving system 152. In one example, the water flow actuator driving system 152 may include a skid (128-132) that reduces skidding of the vessel during propulsion, and a strut (134, 136) that adjusts the depth of the water flow actuators in the water. The water flow actuators may be directly coupled to a prime mover (e.g. multiple prime movers 110, 112, 114 for multiple water flow actuators) in directly driven systems. Alternatively, the water flow actuators may be coupled to the prime mover via a power source (116, 118, 120, 148 for the multiple water flow actuators) and a thrust motor (122, 124, 126 for the water flow actuators), which provides additional drive to the water flow actuators. The power source may be an electric power supply, or a hydraulic power supply. In one example, multiple water flow actuators operate with one prime mover. In another example, each water flow actuator is driven by a separate prime mover, thereby providing a greater range of power for the vessel. Multi-engine vessels may be used for heavy duty applications including offshore drilling of oil.

In one embodiment as shown in FIG. 1, each of the water flow actuators may be additionally coupled to one or more energy storage devices, such as energy storage device 150. In one example, the energy storage device is a battery. Alternatively, the energy storage device may include a super capacitor, a hydraulic system, or rotating inertia. The energy storage device can store the recovered braking energy from the water flow actuators. Further, the system can then redistribute the stored energy as required to various components of the vessel, such as other water flow actuators and/or other electrical loads. In another example, the energy recovered from a braking water flow actuator may be directly supplied to drive another driven water flow actuator.

Referring back to FIG. 1, the water flow actuators 137 and 138 shown at the front end of the vessel 10 may be tunnel thrusters, for example. Further, the water flow actuators 139 and 140 shown at the rear end of the vessel 10 may be azimuthing propellers, with a pod 156 at the core, coupled to rotating blades 154. Each water flow actuator may perform a different operation (e.g. braking, idling, or driving) when the vessel is performing dynamic positioning and/or braking. Further, in some examples, such as the tunnel thrusters, regenerated braking can be used to change a direction of a force vector on the vessel, without changing the direction of rotation of the actuator. As described herein, the position control may have a reduced error by using regenerative braking since one or more water flow actuators can have an effectively increased dynamic range.

Specifically, without dynamic braking, a water flow actuator's output torque is limited between a maximum driving force, and no driving (idle). At the control limits, reduction in the position error is constrained by the drag limits, engine and other load limits, and inertia of the vessel. However, by extending the dynamic range of the water flow actuators to include braking forces, these limits can be at least partially removed, and more accurate position control can be achieved. In one embodiment, the braking energy including that caused by drag may be recovered and stored, and as such decrease errors in position control of the vessel.

Additionally, the dynamic braking described herein may be used to maintain the position of the vessel in a first direction, while the vessel moves in a second direction orthogonal to the first direction. Such may be the case where the vessel is moving transverse to the wind or waves, and dynamic braking in the direction of the waves/wind may be used to maintain the vessel's heading while improving vessel propulsion efficiency as it moves transverse to the wind/waves. Another example of such a situation includes when a first vessel is being moved/towed by a second vessel, such as by a tug. Here, the first vessel may be moved in a first direction by the tug. Concurrently, the first vessel can recover braking energy to maintain the first vessel's sideways position against wind, waves, etc.

In additional to the various alternative configurations described above, in still another alternative embodiment, the ship may include a dedicated auxiliary motor and propeller/thruster drive arrangement use solely for regeneration operation. For example, a the auxiliary drive may be configured to have a lower minimum operable torque than other components of the propulsion system, such as those described above.

Figure 2:
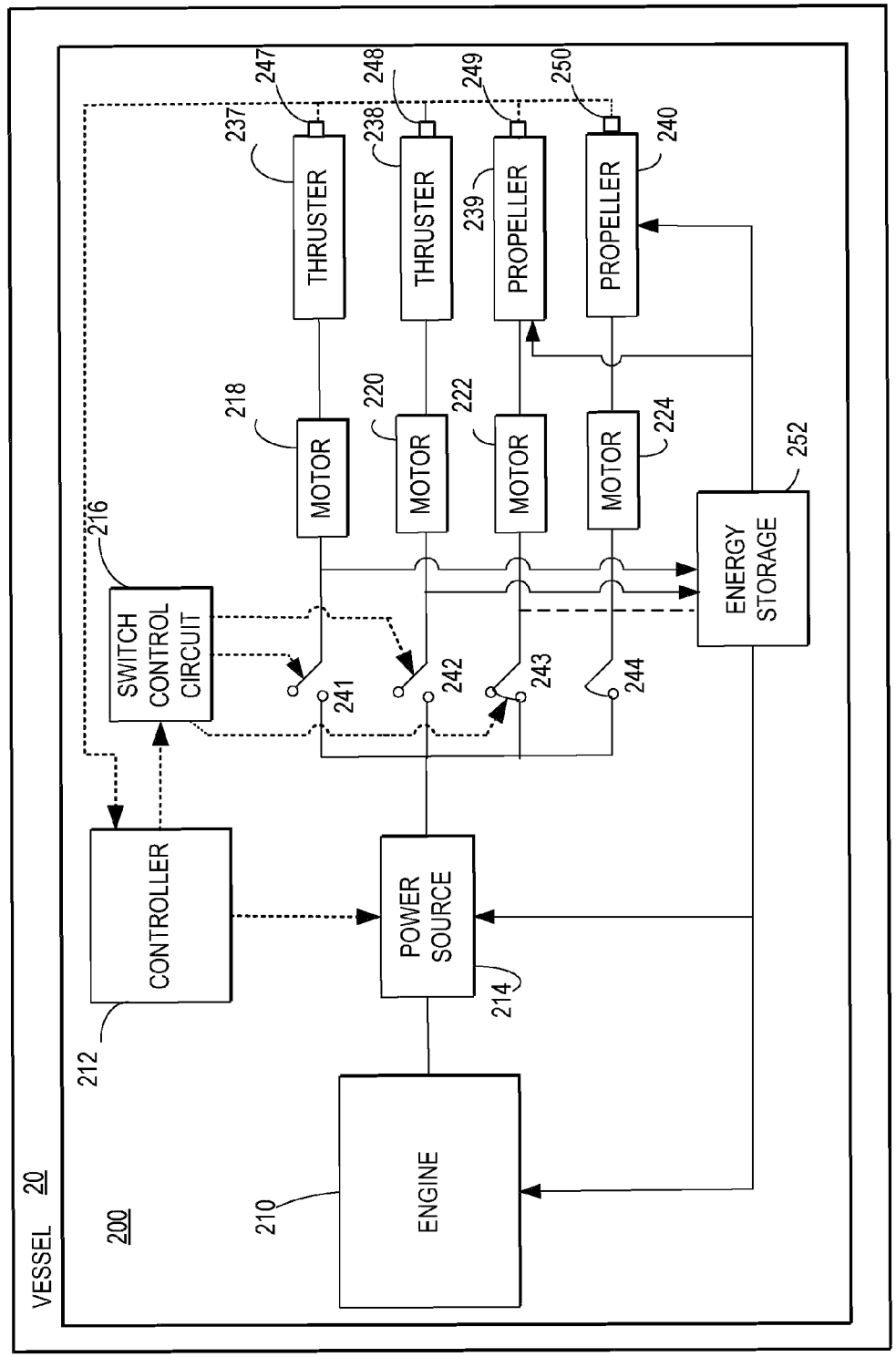
FIG. 2 shows an example block diagram of a vessel propulsion system.

FIG. 2 shows an example propulsion system 200 in a waterborne vessel 20, with a controller 212, a pair of propellers (239 and 240), and a pair of thrusters (237 and 238). In one example, the propellers/thrusters may be coupled to multiple motors (218-224), a power source 214, an engine 210, and an energy storage device 252. Switches 241-244 selectively couple, either the power source 214 or the energy storage device 252, to the water flow actuators. Sensors 247-250 coupled to the propellers/thrusters give information to the controller, where the controller determines the desired mode of operation of the water flow actuators, e.g. braking or motoring, based on the sensor information and the desired position. Based on the sensor input, the controller 212 sends signals to a switch control circuit 216, which enables the selective opening and closing of the corresponding switches. For example, when the thrusters 237 and 238 are in a braking mode, and the propellers 239 and 240 are in a driving mode, then switches 241 and 242 are open to recover the braking energy, and switches 243 and 244 are closed, so that the driving power is supplied from the power source. In another example, the braking energy regenerated may be directly supplied to the driven propellers to aid in motoring.

The braking energy may be regenerated when the vessel is moving relative to the surrounding water, and/or when the vessel is stationary relative to the surrounding water. For example, when the vessel is moving relative to the water, the relative velocity creates a force on the propeller, which causes a rotation of the propeller blades. The kinetic energy (e.g. rotation) of the blades may then be harnessed. Additionally, in the example of a tunnel thruster, inside the tunnel there may be a flow of water generating a thrust (e.g., where the thruster is generating a holding force to counteract wind), even when the vessel is stationary relative to the surrounding water. Here, the kinetic energy in the water flow of the thruster may be harnessed. However, when the water flow in the thruster is stationary, substantially no regenerative braking is available, and the thruster may be driven to reverse the flow direction and generate the desired force vector on the vessel.

Figure 3:
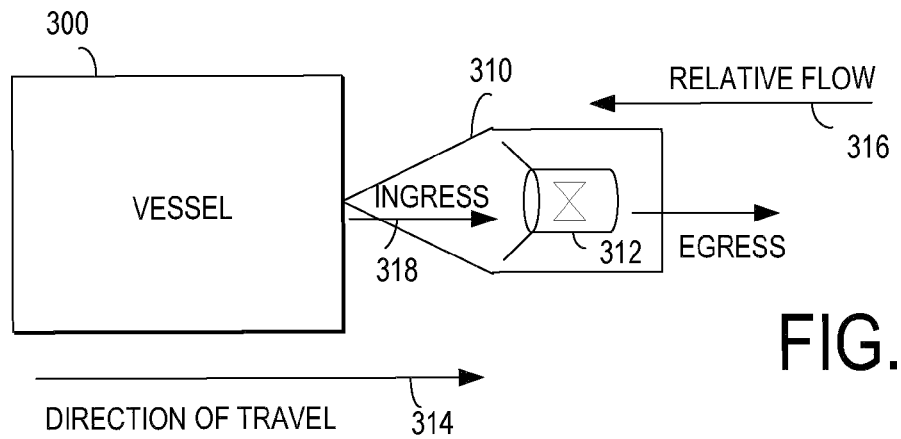
FIG. 3 shows a schematic representation of a vessel and a tunnel thruster.

Referring to FIG. 3, it illustrates figuratively fluid flow dynamics during vessel propulsion, and energy regeneration during braking. In one example, when the water flow actuator is braking, the vessel's propelling inertia 300 creates a relative flow 316 in the tunnel thruster that drives the thruster's propeller inertia 310. The rotation of the propeller generates braking of the vessel, as well as kinetic energy, which can then be harnessed by the propulsion system.

Referring back to FIG. 3, it also shows variable size orifice 320, to regulate the fluid flow ingress 318 into the thruster arrangement. The variable size orifice may enable an improved adjustment of the water flow actuator's torque, by enabling the adjustment of the volumetric flow of water through the thruster. Additionally, the orifice may be used during braking to adjust a braking force on the vessel, as well as to adjust an amount of energy that has been recovered.

Figure 4:
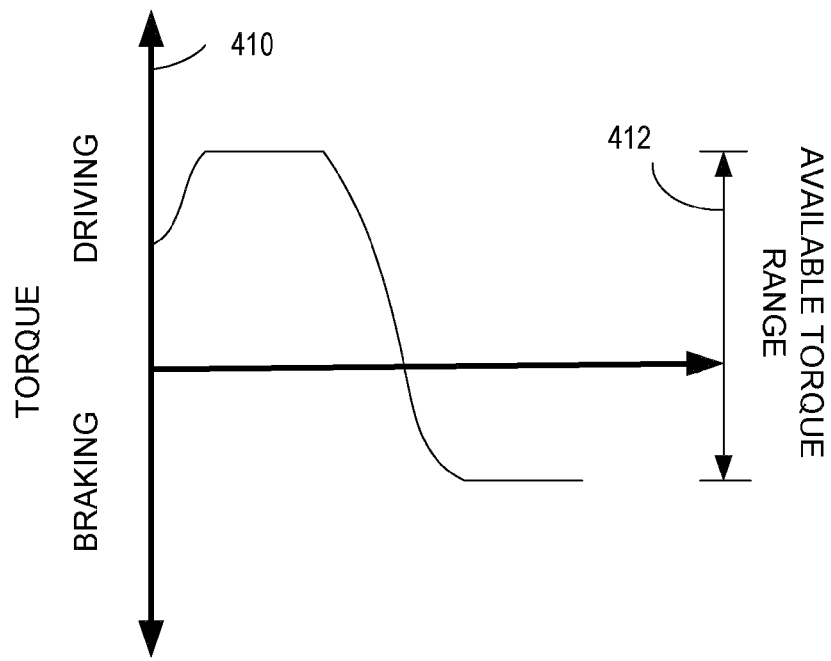
FIG. 4 shows an example graph of a water flow actuator's dynamic torque range.

Referring to FIG. 4, it graphically illustrates variation in a torque range of a water flow actuator during a waterborne vessel's position control. The vertical axis 410 represents the torque at the water flow actuator. In non-regenerating systems, the lower portion of the torque below the horizontal axis, e.g. braking, is not available, since either the water flow actuator is motoring or not motoring (idling). In one embodiment, since the braking torque can be regenerated, the dynamic torque range 412 available for the water flow actuator is expanded.

Figure 5:
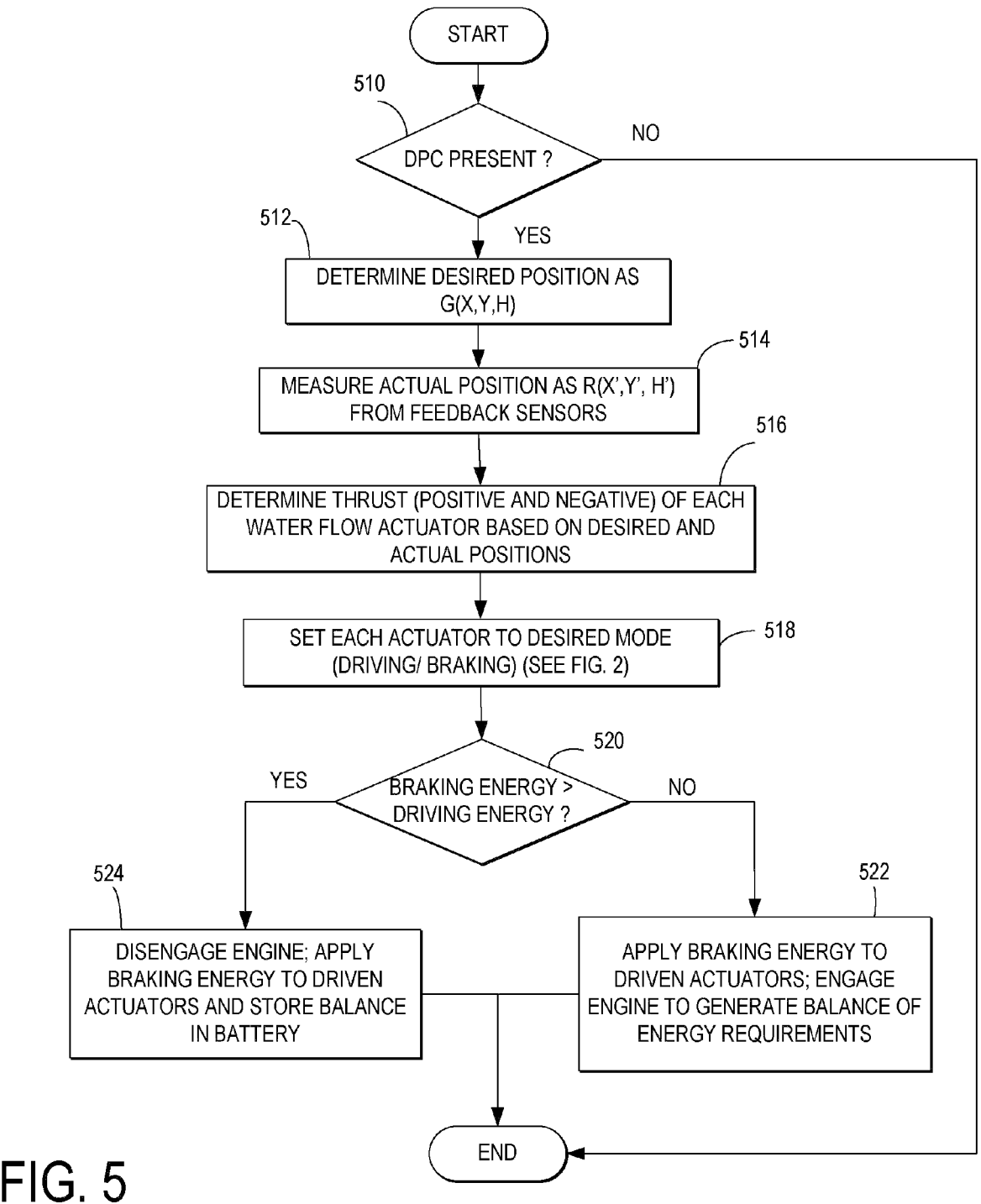
FIG. 5 shows an example process flow of dynamic positioning control with regenerative braking in a vessel.

Referring to FIG. 5, it depicts an example process flow to achieve braking energy recovery during dynamic positioning of a waterborne vessel that may be carried out by controller 212. At 510, the process flow determines whether the vessel is maintaining a desired position with a dynamic positioning controller (DPC). The DPC may use various control architectures, such as a state space controller, a proportional-integral-derivative (PID) controller, a non-linear controller, etc. If the vessel is not maintaining a desired position, the process flow ends.

Otherwise, at 512, a desired position of the vessel is determined. In one example, the operator may set a desired latitude, longitude, and heading for the vessel, e.g. as (x,y,z) or ($\rho,\theta,\phi$), or in any other coordinate system. Alternatively, desired position may be predetermined, or received from communication with another controller, satellite communication system, etc.

At 514, the actual position is measured by the DPC. For example, the feedback sensors including environmental, position, and motion sensors, may send inputs to the DPC as to where the vessel is actually located at any point in time. The measured position and the desired position are then compared by the DPC to generate one or more error values.

Depending on the errors, at 516, the DPC may calculate a desired thrust amount and/or direction requested from each of the water flow actuators to reduce the error(s) and maintain the desired position.

In one example, the DPC may request that some water flow actuators provide negative (braking) thrust, some water flow actuators provide positive (driving) thrust, and some water flow actuators provide no thrust (idle) to reduce the error(s). In one example, during a first condition, the DPC adjusts a first water flow actuator as a driven actuator, and adjusts a second water flow actuator as a braking actuator. Specifically, the DPC operates the motor coupled to the first actuator to drive the first actuator, and operates a second motor coupled to the second actuator to brake the second actuator and thereby generate energy. During a second condition, the roles of the first and second actuator are reversed. During a third condition, the DPC operates both actuators to drive the vessel. Finally, during a fourth condition, the DPC operates both actuators to brake the vessel and generate energy. As noted above, the actuators may both be tunnel thrusters and/or propellers. In another example, the first actuator may be a propeller, and the second actuator a tunnel thruster.

Figure 6:
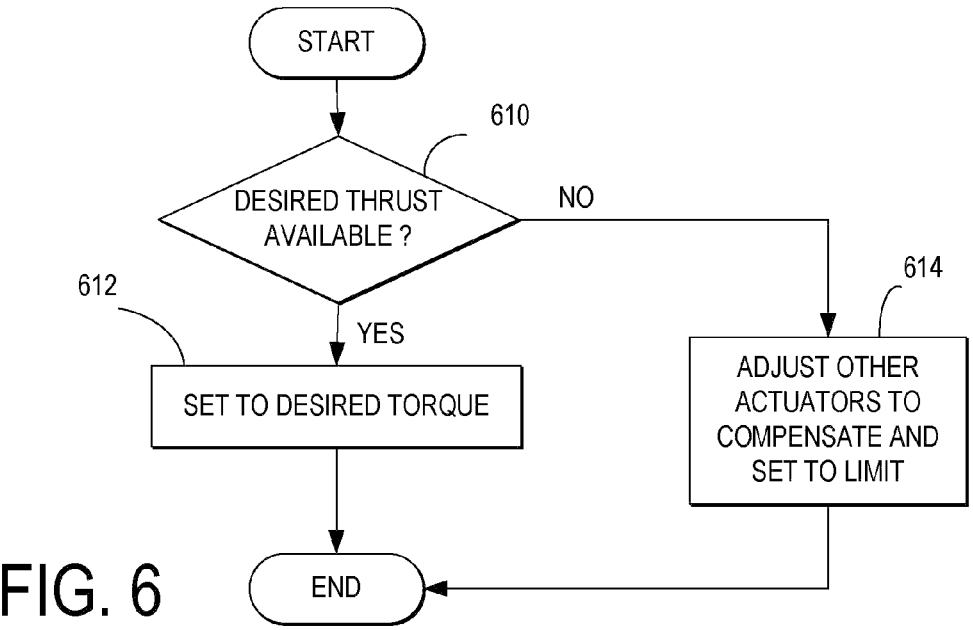
FIG. 6 shows an example process flow of torque adjustment of a single water flow actuator within operating limits.

The DPC may also limit requested thrusts based on the operating conditions, since the available thrust from an actuator may vary with operating conditions. For example, in the example of a tunnel thruster, the negative thrust availability may depend on a volume and/or velocity of flow in the tunnel. FIG. 6, described below, provides additional details for adjusting the requested thrust values to be within operational limits of the actuators. As determined at 516, the water flow actuators may be set to the corresponding modes, at 518. Then, at 520, the total braking energy generated, and the total driving energy requirements may be compared. In one example, if the total braking energy generated is lower than the total driving energy requirements, it indicates that an additional power drive is required to supply the remainder of the energy to the driven water flow actuators, and the routine continues to 522. At 522, the braking energy generated is supplied to the driven water flow actuators, and additionally one or more engines are engaged to generate the balance of the energy requirements.

Otherwise, if the total braking energy generated is greater than the total driving energy requirements, it indicates that the braking energy generated is sufficient to supply for the total energy requirements of the driven water flow actuators, and the remainder of braking energy may be stored in an energy storage device. The routine continues to 524, where one or more engines are disengaged and the total energy is compensated by the braking energy. In another example, driving energy may be supplied entirely by the engine/power source, and the braking energy may be stored in the energy storage device.

Referring to FIG. 6, it shows an example process flow for adjusting a water flow actuator's torque levels within available limits. At 610, it is determined if the desired thrust falls within the operating limits of the particular water flow actuator. If the answer is yes, the routine continues to 612, where the water flow actuator may be set to the desired torque. If the desired thrust falls beyond the operating limits of the water flow actuator, then the routine continues to 614 to adjust other water flow actuators to compensate.

In one example, the operating limits for a water flow actuator may be determined based on operating conditions. For example, the amount of negative (braking) thrust available can depend on the relative flow of water around or through the actuator. As another example, the amount may be a function of temperature of the regenerating motor coupled to the actuator.

In this manner, the routine described in FIG. 6 adjusts the settings of the various water flow actuators to compensate for the effects of operating conditions and limits of the actuators to drive and/or brake the vessel.

Figure 7:
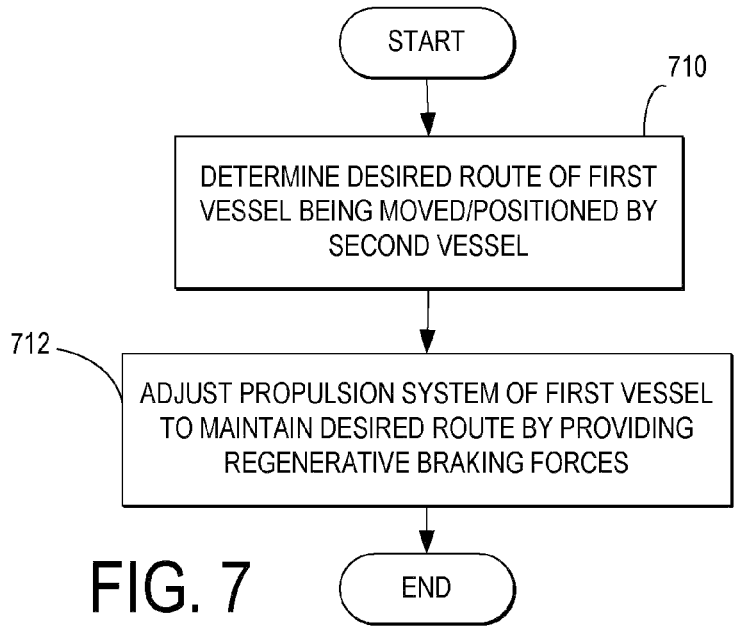
FIG. 7 shows an example process flow for operating a first vessel being propelled via a second vessel.

Referring now to FIG. 7, it shows a routine for controlling energy recovery in a first vessel being moved by a second vessel, such as the second vessel being a tug towing the first vessel, as described above herein. In this example, the control of energy recovering in the first vessel may be based on maintaining a desired route and/or reaching a final position. Specifically at 710, the routine determines a desired route (and/or desired final position), and compares this desired value to the current route/final position as indicated by various sensors, such as those noted above herein. The desired route may be based on pilot commands, a predetermined route, GPS, or other source. Next, at 712, the routine adjusts the propulsion system of the first vessel to generate braking forces at appropriate locations based on the desired and actual routes to better control the vessel to the desired route, as described above herein, such as with regard to FIG. 5. This operation can be applied even when the first vessel is, for example, steered, by a pilot, where the routine selects the desired route based on the pilot input/steering, and then adjusts the propulsion to provide regenerative braking forces to achieve the pilot commands.

In this way, it is possible to take advantage of dynamic energy recovery in the first vessel while it is being moved, positioned (for example through towing) by the second vessel, even when the first vessel is not providing, or unable to provide, driving power. This can thus provide more accurate control of the first vessel's route, as well as improving its efficiency.

Note that the example control and estimation routines included herein can be used with various engine and/or vessel system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for a waterborne vessel, comprising:
   an engine;
   an electrical power generator coupled to the engine;
   a battery;
   a first motor coupled to a first water flow actuator for controlling positioning of the vessel, the first motor electrically coupled to the electrical power generator and the battery;
   a second motor coupled to a second water flow actuator for controlling positioning of the vessel, the second motor electrically coupled to the electrical power generator and the battery;
   an electronic controller for maintaining position of the waterborne vessel by adjusting at least the first water flow actuator and the second water flow actuator, the controller operating the first motor to drive the first water flow actuator while operating the second motor to brake the second water flow actuator during a first condition, the controller further operating the second motor to drive the second water flow actuator while operating the first motor to brake the first water flow actuator during a second condition, wherein the controller operates the second motor to regenerate energy from the second water flow actuator during the first condition, and operates the first motor to regenerate energy from the first water flow actuator during the second condition.

2. The system of claim 1, wherein, during the first condition, the regenerated energy from the second water flow actuator drives the first water flow actuator.

3. The system of claim 1, wherein the electronic controller operates the battery to store the regenerated energy.

4. The system of claim 1 wherein, during the second condition, the regenerated energy from the first water flow actuator drives the second water flow actuator.

5. A system for a waterborne vessel, comprising:
   an engine;
   an electrical power generator coupled to the engine;
   a battery;
   a first motor coupled to a first thruster for controlling positioning of the vessel, the first motor electrically coupled to the electrical power generator and the battery;
   a second motor coupled to a second thruster for controlling positioning of the vessel, the second motor electrically coupled to the electrical power generator and the battery;
   a third motor coupled to a propeller for controlling positioning of the vessel, the third motor electrically coupled to the electrical power generator and the battery
   an electronic controller for maintaining position of the waterborne vessel by adjusting the thrusters and propeller, where each of the thrusters and propeller is adjusted to maintain position of the vessel by operating to drive and brake the vessel in response to feedback of vessel position, where during the braking, energy is recovered and electrical energy is generated and stored in the battery or delivered to a driving water flow actuator.

6. The system of claim 5, wherein the electronic controller selectively varies which of the thrusters and propeller brakes the vessel in response to the feedback of vessel position.

7. The system of claim 5, wherein the electronic controller selectively varies which of the thrusters and propeller drives the vessel in response to the feedback of vessel position.

8. The system of claim 5, wherein the electronic controller operates the thrusters to brake the vessel while the propeller drives the vessel during a first condition, operates the propeller and the first thruster to drive the vessel while the second thruster brakes the vessel during a second condition.

9. The system of claim 5, wherein the controller disengages the engine while maintaining the position.

* * * * *